(12) United States Patent
Wu et al.

(10) Patent No.: US 12,257,902 B2
(45) Date of Patent: Mar. 25, 2025

(54) DISPLAY PANEL AND DISPLAY DEVICE

(71) Applicant: Xiamen Tianma Micro-Electronics Co., Ltd., Xiamen (CN)

(72) Inventors: Hao Wu, Xiamen (CN); Zhuo Deng, Xiamen (CN); Poping Shen, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 161 days.

(21) Appl. No.: 18/346,896

(22) Filed: Jul. 5, 2023

(65) Prior Publication Data

US 2023/0347741 A1    Nov. 2, 2023

(30) Foreign Application Priority Data

Jan. 6, 2023   (CN) .......................... 202310020612.6

(51) Int. Cl.
*B60K 37/02*       (2006.01)
*B60K 35/60*       (2024.01)
(Continued)

(52) U.S. Cl.
CPC .......... *B60K 35/60* (2024.01); *G09G 3/2092* (2013.01); *B60K 35/22* (2024.01); *B60K 35/81* (2024.01);
(Continued)

(58) Field of Classification Search
CPC ........ B60K 35/60; B60K 35/22; B60K 35/81; G09G 3/2092
See application file for complete search history.

(56) References Cited

U.S. PATENT DOCUMENTS 11,532,690 B2 *   12/2022   Liu ...................... G06F 3/0412
11,837,608 B2 *   12/2023   Qin ...................... H10D 86/441
(Continued)

FOREIGN PATENT DOCUMENTS

CN         108646474 A        10/2018
CN         110265468 A        9/2019

OTHER PUBLICATIONS

Chinese Office Action mailed Aug. 8, 2024, issued in related Chinese Application No. 202310020612.6 filed Jan. 6, 2023, 11 pages.

*Primary Examiner* — Tracie Y Green
(74) *Attorney, Agent, or Firm* — CHRISTENSEN O'CONNOR JOHNSON KINDNESS PLLC

(57) ABSTRACT

Display panel and display device are provided. Display panel has display area and bezel area and includes first and second panel edges connected and adjacent to each other and extending linearly in different directions, first functional circuit located in the bezel area and including first functional circuit units. First functional circuit units include first, second, and third circuit units. First circuit units are located at side of first panel edge and arranged linearly along first panel edge, second circuit units are located at side of second panel edge and arranged linearly along second panel edge, third circuit unit is located between first and second circuit units and close to position where first panel edge is connected to second panel edge. One third circuit unit is arranged in direction inclined to a direction in which one first circuit unit is arranged and direction in which one second circuit unit is arranged.

20 Claims, 11 Drawing Sheets

(51) Int. Cl.
*G09G 3/20* (2006.01)
*B60K 35/22* (2024.01)
*B60K 35/81* (2024.01)

(52) U.S. Cl.
CPC .... *B60K 2360/31* (2024.01); *B60K 2360/688* (2024.01); *G09G 2300/0413* (2013.01); *G09G 2310/0213* (2013.01); *G09G 2360/04* (2013.01); *G09G 2380/10* (2013.01)

(56) References Cited

U.S. PATENT DOCUMENTS

| | | | |
|---|---|---|---|
| 2021/0056920 A1* | 2/2021 | Shima | G02F 1/1362 |
| 2022/0108645 A1* | 4/2022 | Zhu | G09G 3/2003 |
| 2022/0157895 A1* | 5/2022 | Xu | H10K 59/131 |

* cited by examiner

DISPLAY PANEL AND DISPLAY DEVICE

CROSS-REFERENCE TO RELATED APPLICATIONS

The present application claims priority to Chinese Patent Application No. 202310020612.6, filed on Jan. 6, 2023, the content of which is incorporated herein by reference in its entirety.

TECHNICAL FIELD

The present disclosure relates to the field of display technologies, and in particular, to a display panel and a display device.

BACKGROUND

Irregular display screens are widely used in various display fields. Taking the field of on-vehicle display as an example, in order to provide better viewing experiences to car owners, the appearance design of on-vehicle display screens, such as, an instrument display screen or a center-control display screen, has become more diversified, but the display performance of the irregular display screen still needs to be improved.

SUMMARY

In an aspect, the present disclosure provides a display panel, having a display area and a bezel area surrounding the display area. In an embodiment, the display panel comprises:
- a first panel edge and a second panel edge that are adjacent to and connected to each other, the first panel edge and the second panel edge extending linearly along different directions, respectively; and
- a first functional circuit disposed in the bezel area, the first functional circuit comprising first functional circuit units, the first functional circuit units comprising first circuit units, second circuit units, and at least one third circuit unit,
- wherein the first circuit units are located at a side of the first panel edge and arranged in a straight line along the first panel edge, the second circuit units are located at a side of the second panel edge and arranged in a straight line along the second panel edge, and the at least one third circuit unit is located between the first circuit units and the second circuit units and is close to a position where the first panel edge is connected to the second panel edge, and one of the at least one third circuit unit is arranged in a direction inclined with respect to each of a direction in which one of the first circuit units is arranged and a direction in which one of the second circuit units is arranged.

In another aspect, the present disclosure provides a display device including the display panel described above.

BRIEF DESCRIPTION OF DRAWINGS

In order to more clearly illustrate technical solutions in embodiments of the present disclosure, the accompanying drawings used in the embodiments are briefly introduced as follows. It should be noted that the drawings described as follows are merely part of the embodiments of the present disclosure, other drawings can also be acquired by those skilled in the art.

DESCRIPTION OF EMBODIMENTS

For better illustrating technical solutions of the present disclosure, embodiments of the present disclosure will be described in detail as follows with reference to the accompanying drawings.

It should be noted that, the described embodiments are merely exemplary embodiments of the present disclosure, rather than all embodiments of the present disclosure. All other embodiments obtained by those skilled in the art according to the embodiments of the present disclosure fall within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there may be three relationships, for example, A and/or B may indicate that three cases, i.e., A alone, A and B, and B alone. The character "/" herein generally indicates that the related objects before and after the character form an "or" relationship.

Usually, at least one functional circuit is provided in a bezel area of the display panel, and the functional circuit includes multiple circuit units with a same circuit structure, and the circuit units are connected to signal lines located in a display area and configured to transmit the driving signals for display to the signal lines.

When the display panel has an irregular design, in a related design, a certain angular bend is formed between two panel edges adjacent to and connected to each other in the display panel. It is found in the research that the circuit units in this type of display panel are arranged in a poor manner, which in turn can adversely affect the display performance of the display panel.

Figure 1:
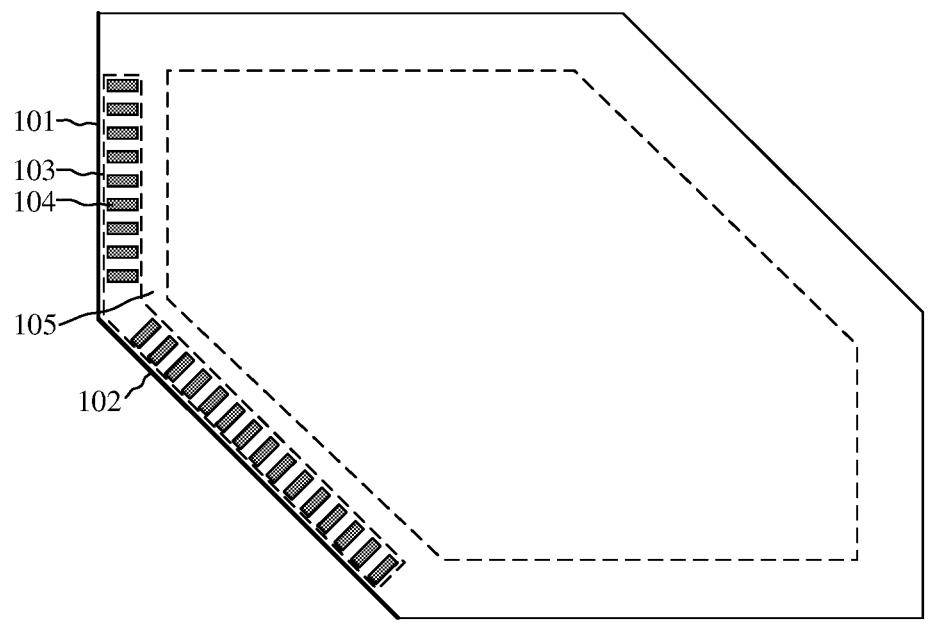
FIG. 1 is a schematic diagram of a display panel in the related art.

FIG. 1 is a schematic diagram of a display panel in the related art. As shown in FIG. 1, the display panel includes a first panel edge 101 and a second panel edge 102 that are connected to and adjacent to each other, the first panel edge 101 and the second panel edge 102 each extend along a straight line, and a bend with a certain angle is formed between the first panel edge 101 and the second panel edge 102. Based on such structure, in the related design, when circuit units 104 in the functional circuit 103 are arranged in a part of the bezel area 105 where the first panel edge 101 and the second panel edge 102 are located, some circuit units 104 are arranged in a straight line along the first panel edge 101 at a side of the first panel edge 101, and some other circuit units 104 are arranged in a straight line along the second panel edge 102 at a side of the second panel edge 102.

However, since a bend with a certain angle is formed between the first panel edge 101 and the second panel edge 102, when the circuit units 104 are arranged in the above-mentioned arrangement, the circuit units 104 located at the side of the first panel edge 101 and other circuit units 104 located at the side of the second panel edge 102 will have an abrupt change in the setting direction at the intersection of the two panel edges.

In the process of the display panel, when the setting direction of the circuit units 104 differs significantly, the circuit units 104 located at the side of the first panel edge 101 and other circuit units 104 located at the side of the second panel edge 102 may have different layout designs, which may lead to that the transistors playing a same role in the circuit units 104 located at the side of the first panel edge 101 and other circuit units 104 located at the side of the second panel edge 102 have different aspect ratios, thus leading to different device performances. Such configuration will also result in a larger gap formed between two adjacent circuit units 104 at the intersection of the first panel edge 101 and the second panel edge 102, and the larger the gap between the two circuit units 104, the greater the risk of differences in device performance between the two circuit units 104. All of the above reasons can lead to differences in the driving signals output by different circuit units 104, which can have an adverse effect on the display performance, such as causing the display panel to have a split screen phenomenon.

Figure 2:
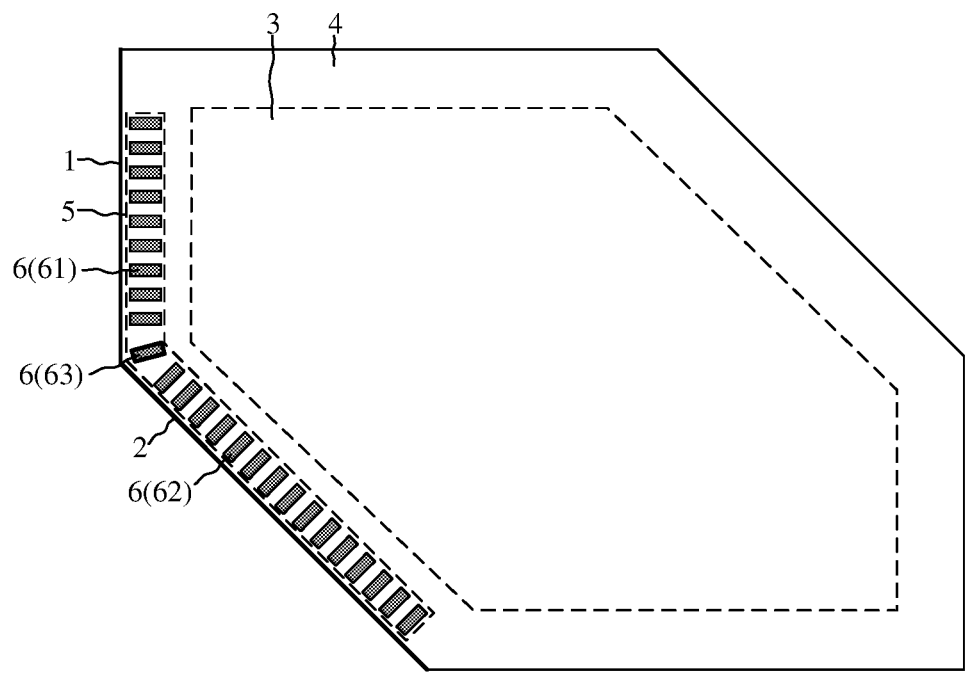
FIG. 2 is a schematic diagram of a display panel according to an embodiment of the present disclosure.

In view of the above, some embodiments of the present disclosure provide a display panel, as shown in FIG. 2 that is a schematic diagram of a display panel provided by some embodiments of the present disclosure, the display panel includes a first panel edge 1 and a second panel edge 2 that are connected to and adjacent to each other, and the first panel edge 1 and the second panel edge 2 extend linearly in different directions, respectively. That is, a bend with a certain angle is formed between the first panel edge 1 and the second panel edge 2. In some embodiments of the present disclosure, an angle formed between the first panel edge 1 and the second panel edge 2 can be an acute angle, a right angle, or an obtuse angle.

The display panel has a display area 3 and a bezel area 4 surrounding the display area 3.

The display panel includes a first functional circuit 5 disposed in the bezel area 4, the first functional circuit 5 includes first functional circuit units 6, and the first functional circuit units 6 includes first circuit units 61, second circuit units 62, and at least one third circuit unit 63.

The first circuit units 61 are located at a side of the first panel edge 1 and arranged in a straight line along the first panel edge 1, the second circuit units 62 are located at a side of the second panel edge 2 and arranged in a straight line along the second panel edge 2, and at least one third circuit unit 63 is located between the first circuit unit 61 and the second circuit unit 62 and close to a position where the first panel edge 1 is connected to the second panel edge 2. The third circuit unit 63 is arranged in a direction that is inclined with respect to each of a direction along which the first circuit unit 61 is arranged and a direction along which the second circuit unit 62 is arranged.

Figure 3:
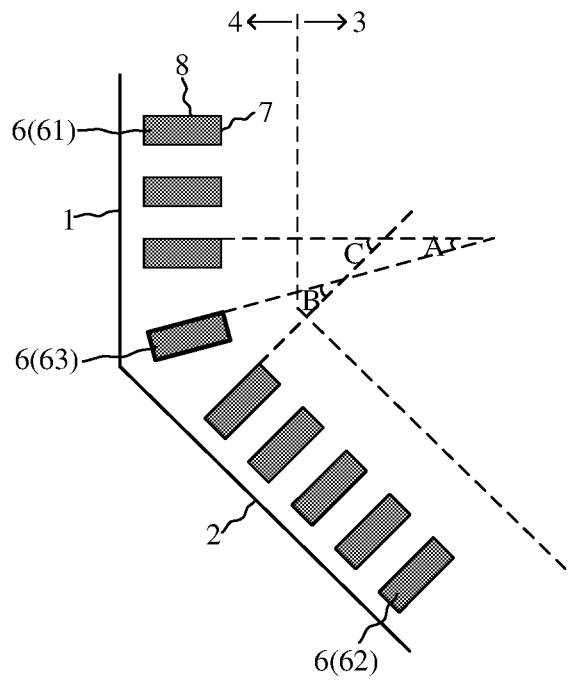
FIG. 3 is a partial schematic diagram of a display panel according to an embodiment of the present disclosure.

FIG. 3 is a partial schematic diagram of a display panel provided in an embodiment of the present disclosure. As shown in FIG. 3, the third circuit unit 63 is inclined as follows. The first functional circuit unit 6 includes a first edge 7 close to a side of the display area 3 and a second edge 8 intersecting with the first edge 7. A first angle A is formed between an extension direction of the second edge 8 of the third circuit unit 63 and an extension direction of a second edge 8 of the first circuit unit 61, and a second angle B is formed between an extension direction of the second edge 8 of the third circuit unit 63 and an extension direction of a second edge 8 of the second circuit unit 62, and both the first angle A and the second angle B are smaller than a third angle C formed between the extension direction of the second edge 8 of the first circuit unit 61 and the extension direction of the second edge 8 of the second circuit unit 62.

In the embodiments of the present disclosure, the third circuit unit 63 is provided at the position where the first panel edge 1 and the second panel edge 2 are connected to each other, and a setting direction of the third circuit unit 63 is inclined relative to both the setting direction of the first circuit unit 61 and the second circuit unit 62, so that the setting direction of the overall first functional circuit unit 6 can be uniformly transitioned from an angle perpendicular to the first panel edge 1 to an angle perpendicular to the second panel edge 2, which prevents the setting direction of the circuit units at a side of the two panel edges from rotating abruptly, and in turn prevents the layout difference caused by the abrupt change in the setting direction and weakens the difference in the device performance of transistors in different first functional circuit units 6. With such configuration, the spacing between the first functional circuit units 6 close to the position where the two panel edges are connected to each other can be reduced, thus effectively weakening the performance difference of the transistors in different first functional circuit units 6.

In summary, the technical solution provided by the embodiments of the present disclosure can improve the arrangement of the first functional circuit units 6, thus reducing the differences in the signals output by different first functional circuit units 6 and improving the display performance of the display panel, such as improving the split screen phenomenon of the display panel. The technical solution is suitable for irregular display panels, for example, more suitable for on-vehicle display panels with more diverse designs.

Figure 4:
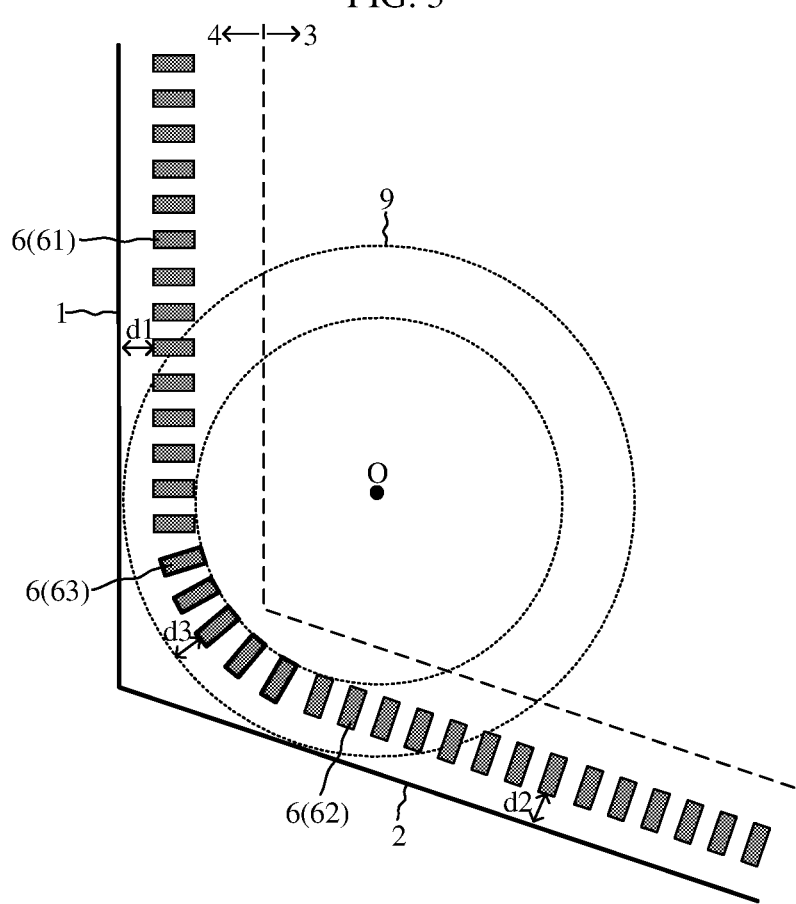
FIG. 4 is another partial schematic diagram of a display panel according to an embodiment of the present disclosure.

FIG. 4 is another partial schematic diagram of a display panel according to an embodiment of the present disclosure. In some embodiments, as shown in FIG. 4, the first functional circuit unit 6 includes multiple third circuit units 63 arranged in the virtual annulus 9 along an edge of the virtual annulus 9. The virtual annulus 9 has a circle center O located in the display area 3, and an outer edge tangential to both the first panel edge 1 and the second panel edge 2.

In the above configuration, multiple third circuit units 63 are rotatably arranged along the virtual annulus 9 at the position where the first panel edge 1 and the second panel edge 2 are connected to each other. The difference between a direction along which two adjacent first circuit units 61 and the third circuit unit 63 are arranged and a direction along which two adjacent third circuit units 63 and the second circuit unit 62 are arranged is small, so that the setting direction of first circuit units 61, the setting direction of the third circuit units 63, and the setting direction of the second circuit units 62 transition more uniformly without a sudden change in setting directions.

When the center of the virtual annulus 9 is located in the display area 3, the outer edge of the virtual annulus 9 is spaced at a certain distance from a top corner of the intersection of the first panel edge 1 and the second panel edge 2 intersect, so that the space between the outer edge of the virtual annulus 9 and the corner of the display area 3 is reduced. In this regard, by making the outer edge of the virtual annulus 9 tangent to both the first panel edge 1 and the second panel edge 2, the embodiments of the present disclosure can make the outer edge of the virtual annulus 9 closer to the panel edge to a greater extent, reduce the distance between the outer edge of the virtual annulus 9 and the top corner of the intersection of the two panel edges, and then leave enough space between the outer edge of the virtual annulus 9 and a corner of the display area 3 to accommodate the third circuit unit 63, which enhances the arrangement of the third circuit unit 63.

When multiple third circuit units 63 are arranged in the virtual annulus 9 along the edge of the virtual annulus 9, in some embodiments, referring to FIG. 4 again, at least one first circuit unit 61 close to the third circuit unit 63 is located in the virtual annulus 9, and at least one second circuit unit 62 close to the third circuit unit 63 is located in the virtual annulus 9.

With such configuration, the difference between the distance between the first circuit unit 61 and the first panel edge 1. Further, the distance between the third circuit unit 63 and the outer edge of the virtual annulus 9 will be not too large, and the setting position of the first circuit unit 61 in the direction of the bezel width of the first panel edge 1 and the setting position of the third circuit unit 63 in the direction of the bezel width of the first panel edge 1 will be not suddenly changed. At the same time, a difference between the distance between the second circuit unit 62 and the second panel edge 2 and the distance between the third circuit unit 63 and the outer edge of the virtual annulus 9 will be not too large, and the setting position of the third circuit unit 63 in the direction of the bezel width of the second panel edge 2 and the setting position of the second circuit unit 62 in the direction of the bezel width of the second panel edge 2 will be not suddenly changed.

Figure 5:
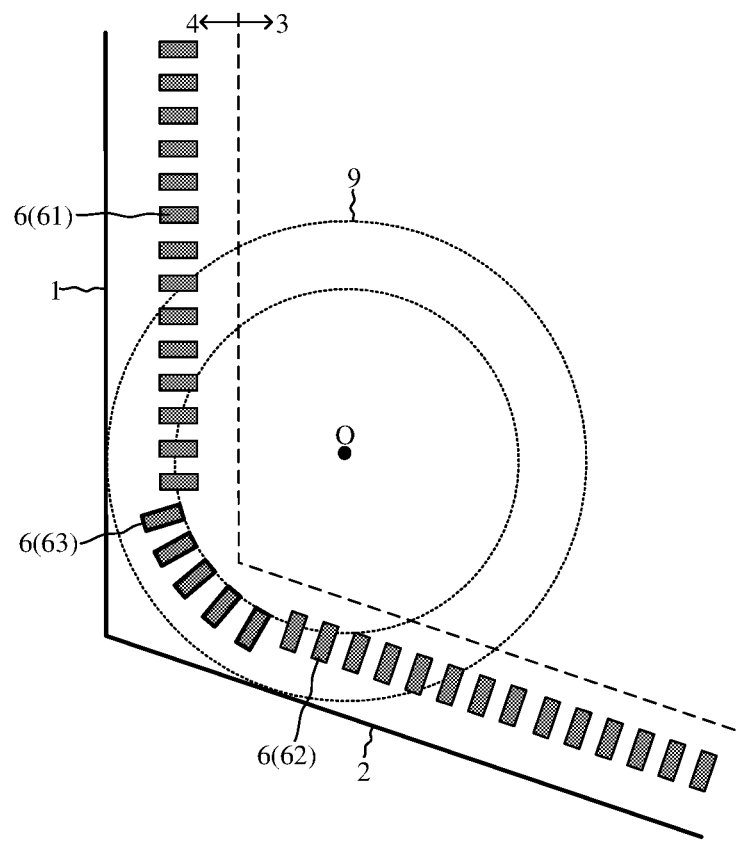
FIG. 5 is another partial schematic diagram of a display panel according to embodiments of the present disclosure.
Figure 6:
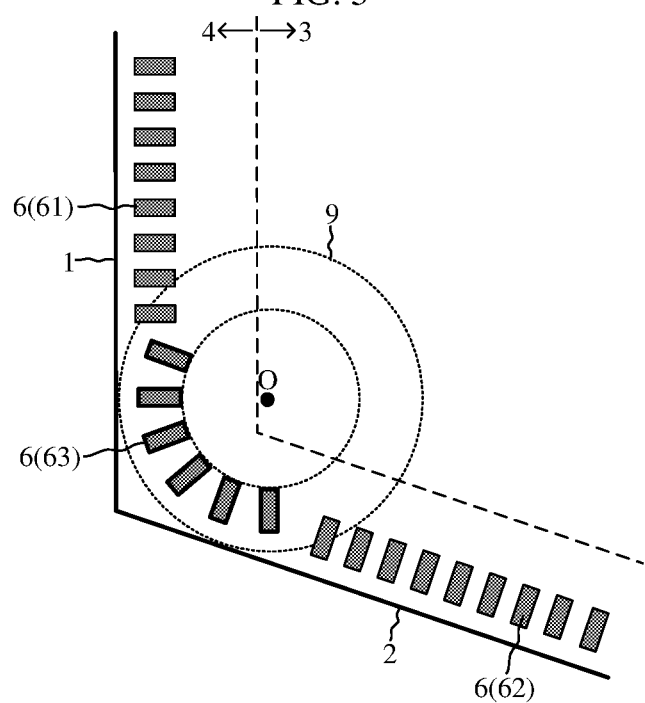
FIG. 6 is another partial schematic diagram of a display panel according to embodiments of the present disclosure.

FIG. 5 is another partial schematic diagram of a display panel provided in an embodiment of the present disclosure, and FIG. 6 is another partial schematic diagram of a display panel provided in an embodiment of the present disclosure. The above configuration can avoid some situations, such as situations as shown in FIG. 5 and FIG. 6, so that a gentler transition is achieved between the setting positions of the first circuit unit 61 and the third circuit unit 63, and a gentler transition is achieved between the setting positions of the third circuit unit 63 and the second circuit unit 62.

When multiple third circuit units 63 are arranged in the virtual annulus 9 along the edge of the virtual annulus 9, in some embodiments, referring to FIG. 4 again, the first circuit unit 61 is spaced apart from the first panel edge 1, the second circuit unit 62 is spaced apart from the second panel edge 2, and the third circuit unit 63 is spaced apart from the outer edge of the virtual annulus 9. Such a configuration avoids the first circuit unit 61 and the second circuit unit 62 being aligned with the panel edge of the display panel, the third circuit unit 63 being too close to the panel edge of the display panel, avoids erosion of the first functional circuit unit 6 caused by water and oxygen, and reduces the risk of performance failure of the device in the first functional circuit unit 6.

In some embodiments, to achieve a smoother transition between the first circuit unit 61, the second circuit unit 62, and the third circuit unit 63, referring to FIG. 4 again, a distance d1 between the first circuit unit 61 and the first panel edge 1, a distance d2 between the second circuit unit 62 and the second panel edge 2, and a distance d3 between the third circuit unit 63 and the outer edge of the virtual annulus 9 are equal to each other.

In some embodiments, referring to FIG. 4 again, multiple third circuit units 63 are arranged at an equal interval. In this case, an angle between the setting directions of every two adjacent third circuit units 63 tends to be a same value, the third circuit units 63 rotate uniformly in the virtual annulus 9 along the edge of the virtual annulus 9, and the transition between the first circuit unit 61, the second circuit unit 62, and the third circuit unit 63 is gentler.

Figure 7:
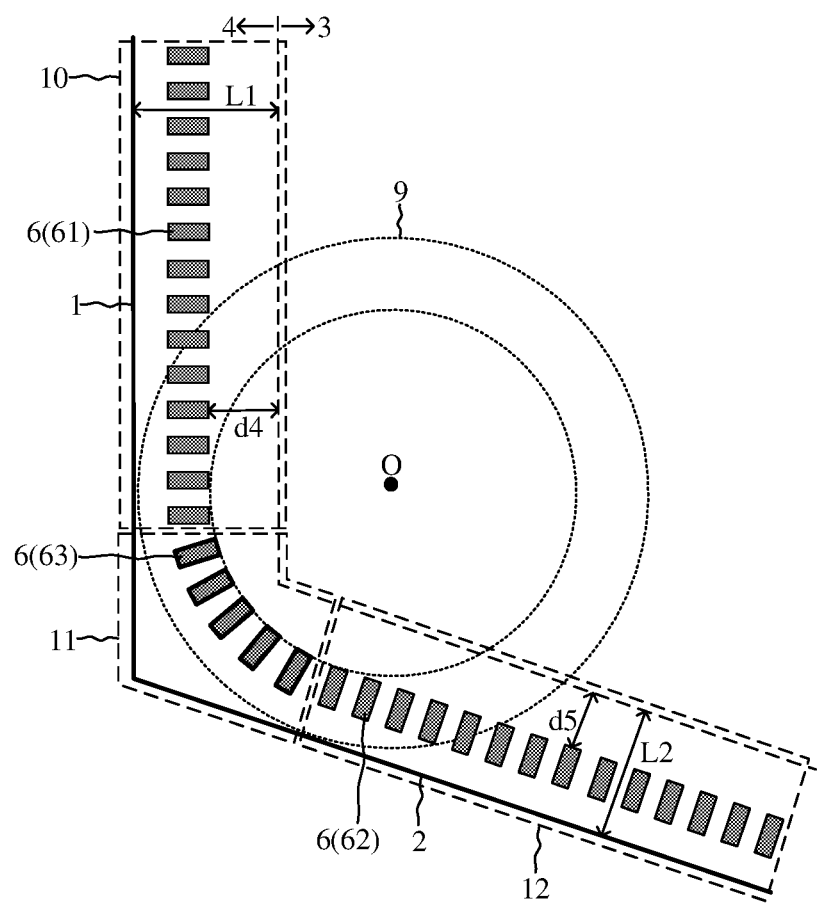
FIG. 7 is another partial schematic diagram of a display panel according to embodiments of the present disclosure.

FIG. 7 is another partial schematic diagram of a display panel provided in an embodiment of the present disclosure. In some embodiments, as shown in FIG. 7, the bezel area 4 has a first linear bezel 10, a corner bezel 11, and a second linear bezel 12 that are defined by the first panel edge 1 and the second panel edge 2, the first circuit unit 61 is located in the first linear bezel 10, the second circuit unit 62 is located in the second The first circuit unit 61 is located at the first straight edge 10, the second circuit unit 62 is located at the second straight edge 12, and the third circuit unit 63 is located at the corner edge 11.

A bezel width L1 of the first linear bezel 10 and a bezel width L2 of the second linear bezel 12 are equal to each other, and a distance d4 between the first circuit unit 61 and the display area 3 and a distance d5 between the second circuit unit 62 and the display area 3 are equal to each other.

For a panel structure with two linear bezel having a same width, when the distance between the first circuit unit 61 and the display area 3 and the distance between the second circuit unit 62 and the display area 3 are equal to each other, a relative position relationship between the first circuit unit 61 in the first linear bezel 10 and the panel edge of the display panel and a relative position relationship between the first circuit unit 61 and the edge of the display area 3 are the same as a relative position relationship between the second circuit unit 62 in the second linear bezel 12 and the panel edge of the display panel and a relative position relationship between the second circuit unit 62 in the second linear bezel 12 and the edge of the display area 3, and both the first circuit units 61 and the second circuit units 62 can be arranged in a sequence along the third circuit unit 63 in the virtual annulus 9, and the transition of the setting position of the first functional circuit unit 6 is gentler.

Figure 8:
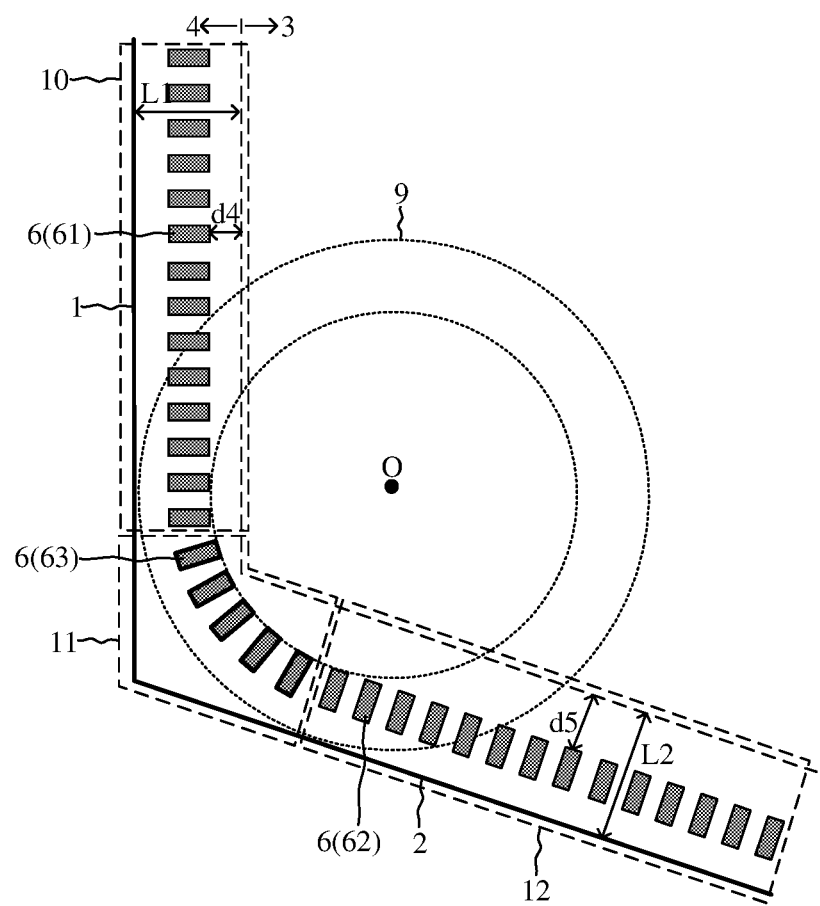
FIG. 8 is another partial schematic diagram of a display panel according to embodiments of the present disclosure.

FIG. 8 is another partial schematic diagram of a display panel provided in an embodiment of the present disclosure. In another embodiment, as shown in FIG. 8, the bezel area 4 includes a first linear bezel 10, a corner bezel 11, and a second linear bezel 12 that are defined by the first panel edge 1 and the second panel edge 2, the first circuit unit 61 is located at the first linear bezel 10, the second circuit unit 62 located at the second linear edge 12, and the third circuit unit 63 is located at the corner edge 11.

A width L2 of the second linear bezel 12 is greater than a width L1 of the first linear bezel 10, and a distance d5 between the second circuit unit 62 and the display area 3 is greater than a distance d4 between the first circuit unit 61 and the display area 3.

For a panel structure with two linear bezels having different widths, when the width of the second linear bezel 12 is larger and the distance between the second circuit unit 62 and the display area 3 is larger, both the first circuit unit 61 and the second circuit unit 62 are closer to the panel edge of the display panel, and both the first circuit units 61 and the second circuit units 62 can be arranged in sequence along the third circuit unit 63 in the dummy circle 9, the transition of the setting positions of the first functional circuit units 6 are gentler.

Figure 9:
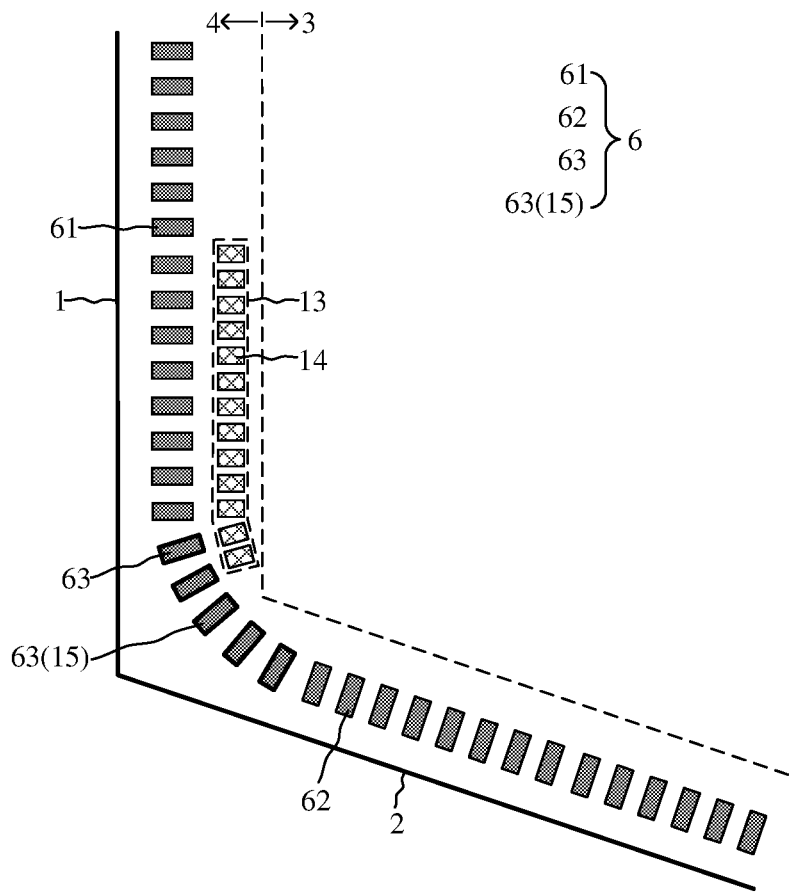
FIG. 9 is another partial schematic diagram of a display panel according to embodiments of the present disclosure.

FIG. 9 is another partial schematic diagram of a display panel provided in an embodiment of the present disclosure. In some embodiments, as shown in FIG. 9, the display panel includes a second functional circuit 13 located in the bezel area 4, the second functional circuit 13 includes multiple second functional circuit units 14, at least one second functional circuit unit 14 is located between the display area 3 and the first functional circuit unit 6 located at a side of a first sub-unit 15, and the first sub-unit 15 is one of the third circuit units 63 that is closest to the display area 3.

Since the first sub-unit 15 is the third circuit unit 63 closest to the display area 3, a spacing between the first sub-unit 15 and the display area 3 is small. When at least one second functional circuit unit 14 is arranged between the display area 3 and the first functional circuit unit 6 next to the first sub-unit 15. In this way, it can be avoided that the second functional circuit unit 14 occupies the space between the first sub-unit 15 and the display area 3. Thus, when designing the bezel width, there is no need to enlarge the bezel width in order to accommodate the second functional circuit unit 14 between the first sub-unit 15 and the display area 3, which helps to enhance the narrow bezel design.

Figure 10:
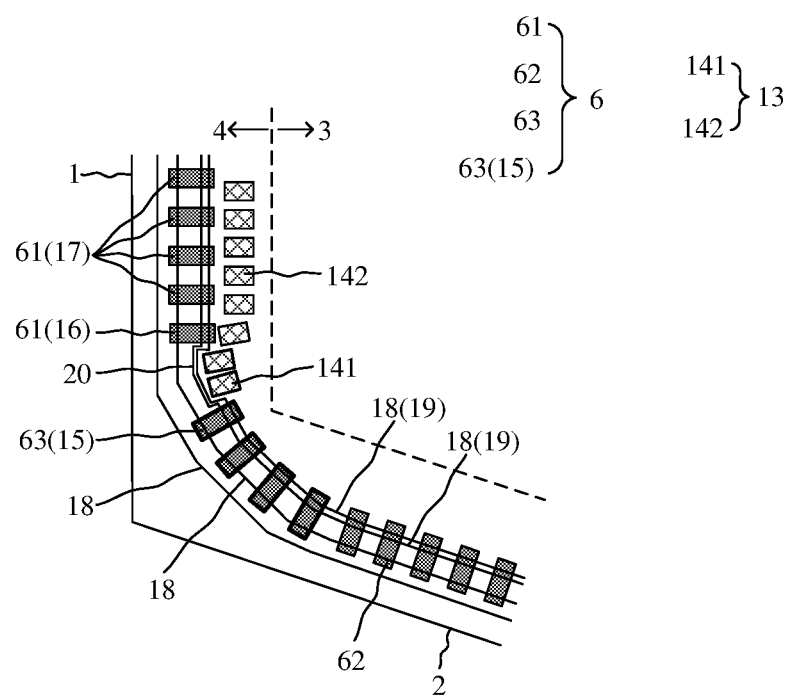
FIG. 10 is another partial schematic diagram of a display panel according to embodiments of the present disclosure.

FIG. 10 is another schematic diagram of a partial structure of a display panel according to an embodiment of the present disclosure. As shown in FIG. 10, the first functional circuit unit 6 also includes a second sub-unit 16 and multiple third sub-units 17, the second sub-unit 16 is adjacent to the first sub-unit 15, and the third sub-unit 17 is located at a side of the second sub-unit 16 away from the first sub-unit 15. A spacing between the first sub-unit 15 and the second sub-unit 16 is greater than a distance between the remaining adjacent third circuit units 63. It can be understood that the second sub-unit 16 can be the third circuit unit 63, the first circuit unit 61, or the second circuit unit 62, which depends on the location of the first sub-unit 15.

The multiple second functional circuit units 14 include a fourth circuit unit 141 and a fifth circuit unit 142, at least part of the fourth circuit unit 141 is located between the first sub-unit 15 and the second sub-unit 16, and the fifth circuit units 142 are located at a side of the second sub-unit 16 close to the display area 3 and a side of at least one third sub-unit 17 close to the display area 3, respectively.

When the first sub-unit 15 is the third circuit unit 63 closest to the display area 3, the spacing between the display area 3 and the second sub-unit 16 adjacent to the first sub-unit may also be relatively small, and the above configuration can provide a space for accommodating the fourth circuit unit 141 between the first sub-unit 15 and the second sub-unit 16 by increasing the spacing between the first sub-unit 15 and the second sub-unit 16, so that at least part of the fourth circuit unit 141 is inserted into the space between the first sub-unit 15 and the second sub-unit 16. In this way, when designing the bezel width, there is no need to increase the spacing between the second sub-unit 16 and the display area 3 for the fourth circuit unit 141, and the narrow bezel design can be enhanced.

In some embodiments, referring to FIG. 10 again, the display panel also includes driving signal lines 18 connected to the first functional circuit unit 6, and the driving signal lines 18 may include a frame start signal line, a clock signal line, etc. The driving signal lines 18 include at least one first signal line 19, and the first signal line 19 is located at a side of the second functional circuit 13 away from the display area 3 and extends close to the second functional circuit 13. The first signal line 19 includes a bending portion 20 disposed between the first sub-unit 15 and the second sub-unit 16, the bending portion 20 is bent away from the display area 3, and at least part of the fourth circuit unit 141 is disposed at a side of the bending portion 20 close to the display area 3.

The part of the first signal line 19 located between the first sub-unit 15 and the second sub-unit 16 is bent, so that this part can avoid the fourth circuit unit 141 to free up more setting space for the fourth circuit unit 141.

Figure 11:
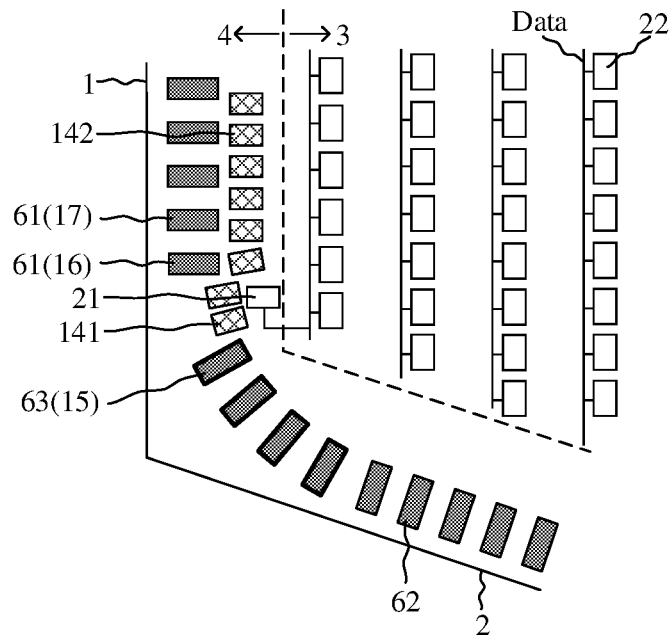
FIG. 11 is another partial schematic diagram of a display panel according to embodiments of the present disclosure.
Figure 12:
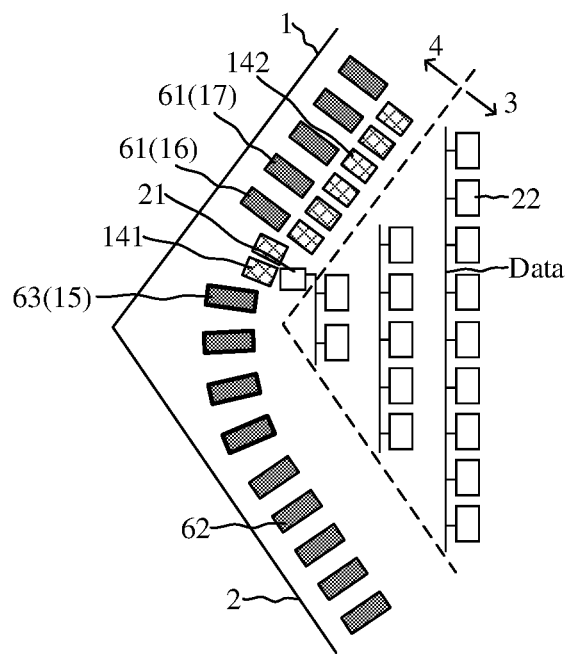
FIG. 12 is another partial schematic diagram of a display panel according to embodiments of the present disclosure.

FIG. 11 is a partial schematic diagram of a display panel provided in an embodiment of the present disclosure, and FIG. 12 is a partial schematic diagram of a display panel provided in an embodiment of the present disclosure. In an embodiment, as shown in FIG. 11 and FIG. 12, the display panel includes dummy sub-pixels 21, at least some of which are located between the fourth circuit unit 141 and the display area 3.

Generally, the third circuit unit 63 (first sub-unit 15) closest to the display area 3 is located near the corner of the display area 3, and the number of display sub-pixels 22 connected to the data line Data near the corner of the display area 3 is usually smaller, resulting in a smaller load. When at least part of the fourth circuit unit 141 is accommodated between the first sub-unit 15 and the second sub-unit 16, the space occupied by the fourth circuit unit 141 can be used to set dummy sub-pixels 21, so that these dummy sub-pixels 21 are connected to the data lines Data at the corners of the display area 3, which in turn improves the load uniformity of the data line Data at different locations.

Figure 13:
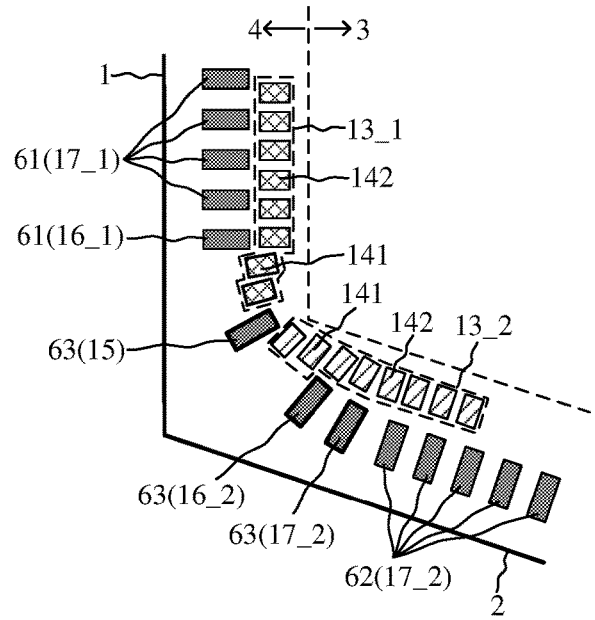
FIG. 13 is another partial schematic diagram of a display panel according to embodiments of the present disclosure.

FIG. 13 is another partial schematic diagram of a display panel according to an embodiment of the present disclosure. In an embodiment, as shown in FIG. 13, the second functional circuit 13 includes a first-type second functional circuit 13_1, the second sub-unit 16 includes a first-type second sub-unit 16_1, and the third sub-unit 17 includes a first-type third sub-unit 17_1. The first-type second sub-unit 16_1 and the first-type third sub-unit 17_1 are located at a side of the first sub-unit 15, and the first-type third sub-unit 17_1 includes the first circuit unit 61.

In the first-type second functional circuit 13_1, at least a part of the fourth circuit unit 141 is located between the first sub-unit 15 and the first-type second sub-unit 16_1, and the fifth circuit units 142 are located at a side of the first-type second sub-unit 16_1 close to the display area 3 and a side of the first-type third sub-unit 17_1 close to the display area 3, respectively.

When the first-type third sub-unit 17_1 includes the first circuit unit 61, it indicates that the first-type second functional circuit 13_1 is located in the bezel at a side of the first panel edge 1. Depending on the location of the first sub-unit 15, the first-type third sub-unit 17_1 may also include a third circuit unit 63.

In another embodiment, the second functional circuit 13 includes a second-type second functional circuit 13_2, the second sub-unit 16 includes a second-type second sub-unit 16_2, and the third sub-unit 17 includes a second-type third sub-unit 17_2. The second-type second sub-unit 16_2 and the second-type third sub-unit 17_2 are located at another side of the first sub-unit 15, and the second-type third sub-unit 17_2 includes a second circuit unit 62.

In the second-type second functional circuit 13_2, at least part of the fourth circuit unit 141 is located between the first sub-unit 15 and the second-type second sub-unit 16_2, and the fifth circuit units 142 are located at a side of the second-type second sub-unit 16_2 close to the display area 3 and a side of the second-type third sub-unit 17_2 close to the display area 3.

When the second-type third sub-unit 17_2 includes the second circuit unit 62, it indicates that the second-type second functional circuit 13_2 is located in the bezel at a side of the second panel edge 2. Depending on the location of the first sub-unit 15, the second-type third sub-unit 17_2 may also include a third circuit unit 63.

In the above configuration, the second functional circuits 13 may be provided at a side of the first panel edge 1 and a side of the second panel edge 2, respectively, and such configuration is suitable for panel structures with a large number of types and numbers of second functional circuits 13.

Figure 14:
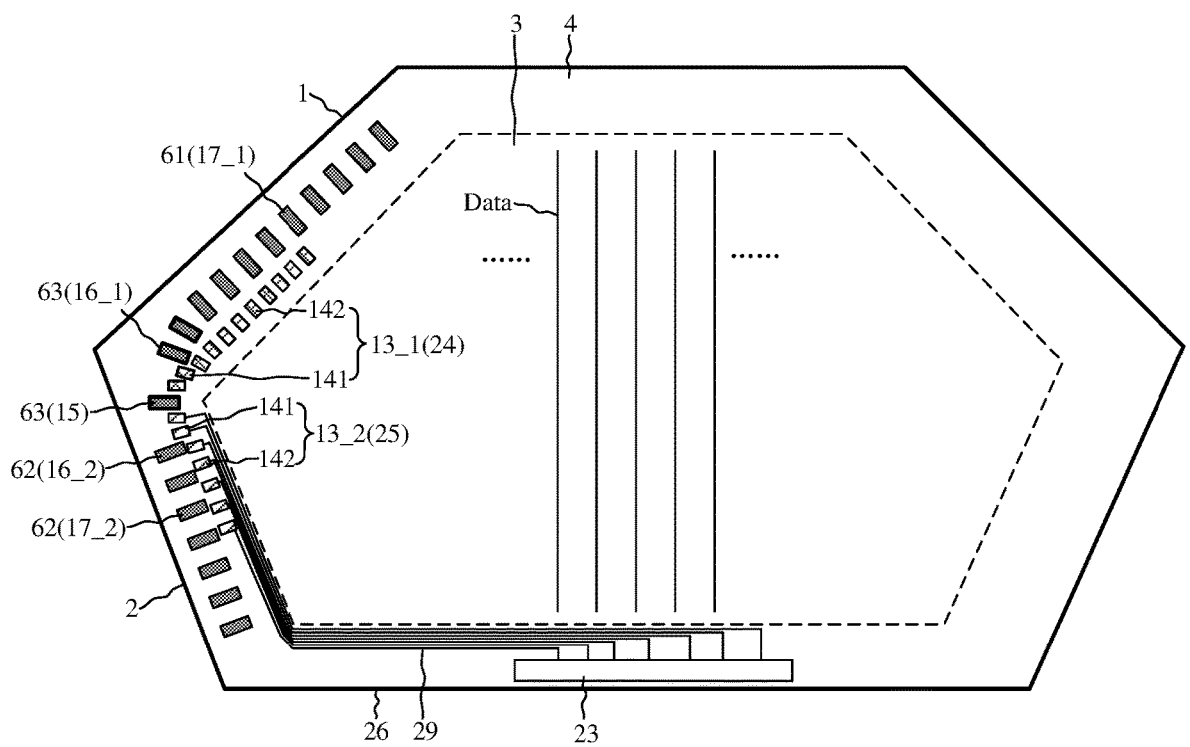
FIG. 14 is another partial schematic diagram of a display panel according to embodiments of the present disclosure.
Figure 15:
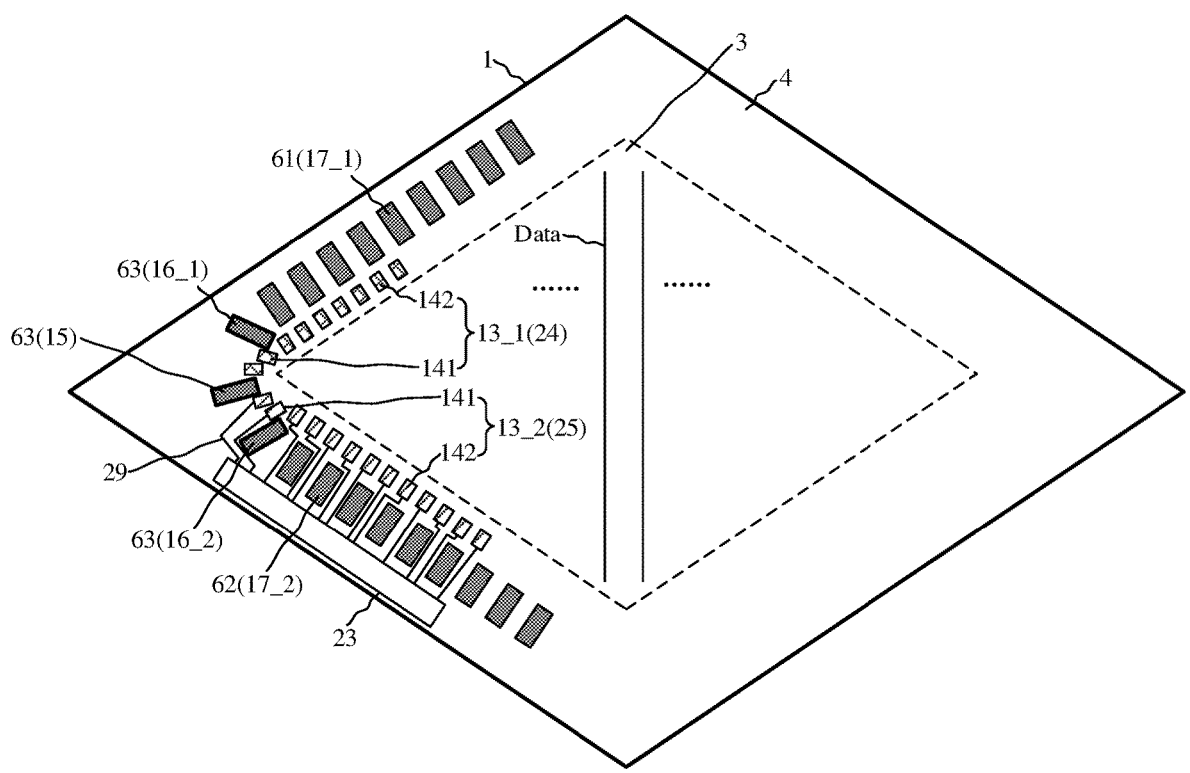
FIG. 15 is another partial schematic diagram of a display panel according to embodiments of the present disclosure.

In some embodiments, with reference to FIG. 14 and FIG. 15, the display panel also includes a data line Data located in the display area 3. The bezel area 4 also includes a bonding area 23, and the bonding area 23 can be used to bind a driver chip, a printed circuit board, and other structures. A distance between the first circuit unit 61 and the bonding area 23 is greater than a distance between the second circuit unit 62 and the bonding area 23.

In view of the above, the first-type second functional circuit 13_1 may include a protection circuit 24 connected to the data line Data (not shown in the figure), and the protection circuit 24 is used to protect the data line Data from electrostatic breakdown. The second-type second functional circuit 13_2 includes a selector circuit 25 connected to the data line Data (not shown in the figure), and the selector circuit 25 is configured to transmit a data voltage to the data line Data in a time-division manner, to reduce the number of pins in the bonding area 23.

Since the selector circuit 25 needs to receive the data voltage supplied by the driver chip or the printed circuit board, the second-type second functional circuit 13_2 that is closer to the bonding area 23 is reused as the selector circuit 25, which reduces the connection distance between the selector circuit 25 and the bonding area 23, facilitating wiring and reducing the voltage drop.

FIG. 14 is a partial schematic diagram of a display panel according to an embodiment of the present disclosure. In an embodiment, as shown in FIG. 14, the display panel includes a third panel edge 26, and the third panel edge 26 extends in a direction perpendicular to an extension direction of the data lines Data. The bonding area 23 is located at a side of the third panel edge 26, and the second-type second functional circuit 13_2 is connected to the pins in the bonding area 23 by connection leads 29.

Since the selector circuit 25 needs to receive the data voltage provided by the driver chip or the printed circuit board, when the bonding area 23 and the second-type second functional circuit 13_2 (selector circuit 25) are located at different sides of the edge, the second-type second functional circuit 13_2 (selector circuit 25) can be connected to the pins in the bonding area 23 through the connection lead 29, thus realizing the connection with the driver chip or the printed circuit board. The second-type second functional circuit 13_2 (selector circuit 25) can be connected to the pins in the bonding area 23 through the connection lead 29 to achieve connection with the driver chip or the printed circuit board.

In view of the above configuration, the second-type second functional circuit 13_2 (selector circuit 25) is located closer to the bonding area 23, so that the extension length of the connection lead 29 can be shortened to reduce the attenuation of the data voltage during transmission.

FIG. 15 is another partial schematic diagram of a display panel according to an embodiment of the present disclosure. In some embodiments, as shown in FIG. 15, the bonding area 23 is located between the second circuit unit 62 and the second panel edge 2, and the second-type second functional circuit 13_2 is connected to the pin located in the bonding area 23 via the connection lead 29.

Since the selector circuit 25 needs to receive the data voltage provided by the driver chip or the printed circuit board, when the bonding area 23 and the second-type second functional circuit 13_2 (selector circuit 25) are located at a same side of the bezel, the second-type second functional circuit 13_2 (selector circuit 25) can be connected to the pin in the bonding area 23 through the connection lead 29, thus realizing the connection with the driver chip or the printed circuit board.

Based on the above configuration, the second-type second functional circuit 13_2 (selector circuit 25) is closer to the bonding area 23, the extension length of the connection lead 29 can be shortened to reduce the attenuation of the data voltage during transmission.

The display panel may have no lower bezel when the bonding area 23 and the second-type second functional circuit 13_2 (selector circuit 25) are located at a same side of the bezel, and the display panel may be in a shape such as a diamond. In some embodiments, the display panel may have a lower bezel, for example, the second panel edge 2 extends in a direction perpendicular to the extension direction of the data line Data, and the side at which the second circuit unit 62 is located is the lower bezel, and the display panel may be in a shape, such as a parallelogram.

Figure 16:
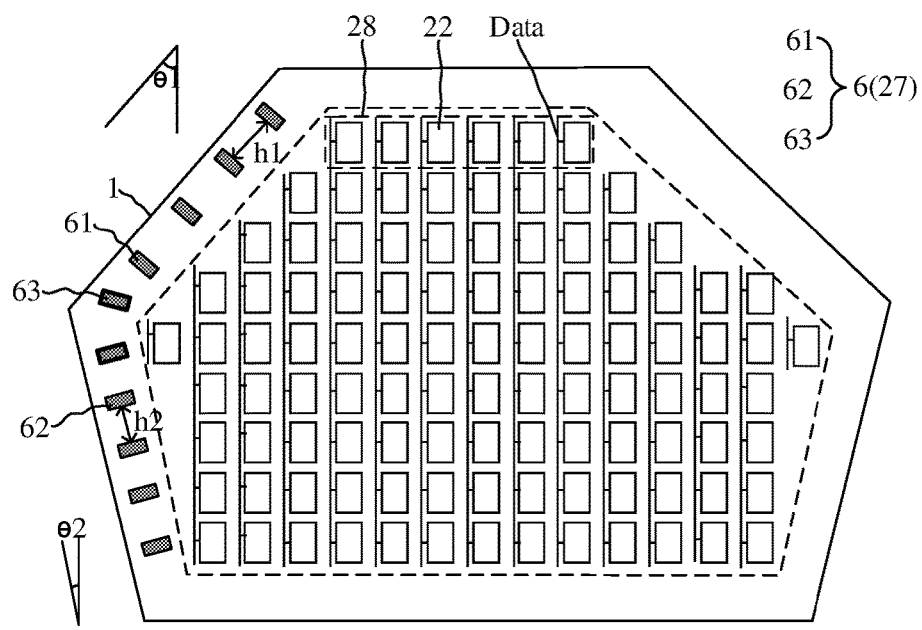
FIG. 16 is another partial schematic diagram of a display panel according to embodiments of the present disclosure.
Figure 17:
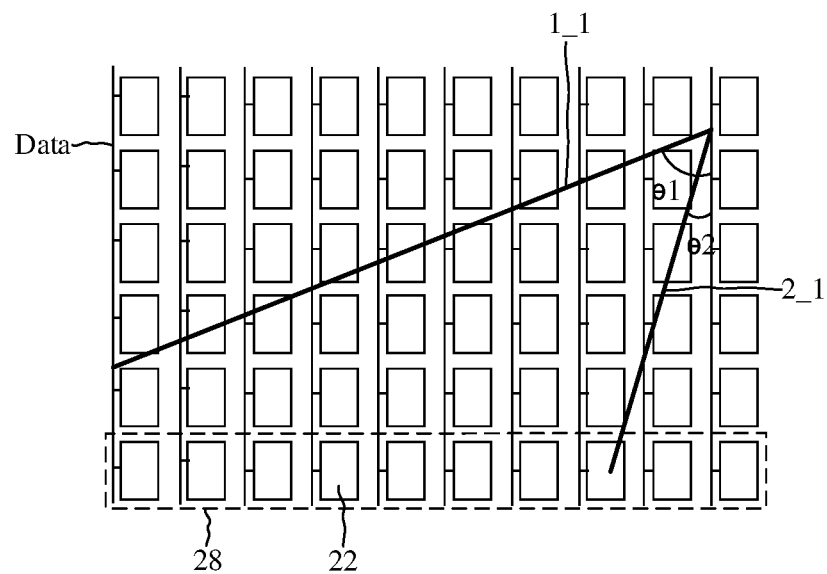
FIG. 17 is a schematic diagram illustrating panel edges, data lines, and pixel rows according to embodiments of the present disclosure.

FIG. 16 is another partial schematic diagram of a display panel provided in an embodiment of the present disclosure, and FIG. 17 is a schematic diagram illustrating a panel edge, a data line Data, and a pixel row 28 provided in an embodiment of the present disclosure. In some embodiments, as shown in FIG. 16 and FIG. 17, the first functional circuit 5 includes a shift register circuit 27. The data line Data is provided in the display area 3, and an angle $\theta 1$ between the extension direction of the first panel edge 1 and the extension direction of the data line Data is greater than an angle $\theta 2$ between the extension direction of the second panel edge 2 and the extension direction of the data line Data, and a spacing h1 between adjacent first circuit units 61 is greater than a spacing h2 between adjacent second circuit units 62.

The reference sign 1_1 in FIG. 17 indicates a straight line parallel to the first panel edge 1, and an angle between the straight line and the data line Data is the angle θ1 between the extension direction of the first panel edge 1 and the extension direction of the data line Data, and the reference sign 2_1 indicates a straight line parallel to the second panel edge 2, and the angle between the straight line and the data line Data is the angle θ2 between the extension direction of the second panel edge 2 and the extension direction of the data line Data.

The shift register circuit 27 is usually electrically connected to the pixel row 28 through the scan signal line, the light-emitting control signal line, etc. Referring to FIG. 17, when the angle between the panel edge and the extension direction of the data line Data is larger, the angle between the panel edge and the extension direction of the pixel row 28 is smaller, then the number of the first functional circuit units 6 corresponding to a side of the panel edge is smaller over a same length, and thus the first functional circuit units 6 at a side of the panel edge are arranged in a sparsely. In this configuration, there is a correlation between an arrangement density of the first functional circuit units 6 at a side of the panel edge and the angle between the extension direction of the first panel edge 1 and the extension direction of the data line Data, and the arrangement of the first functional circuit units 6 at different sides of the panel edge can be enhanced.

Figure 18:
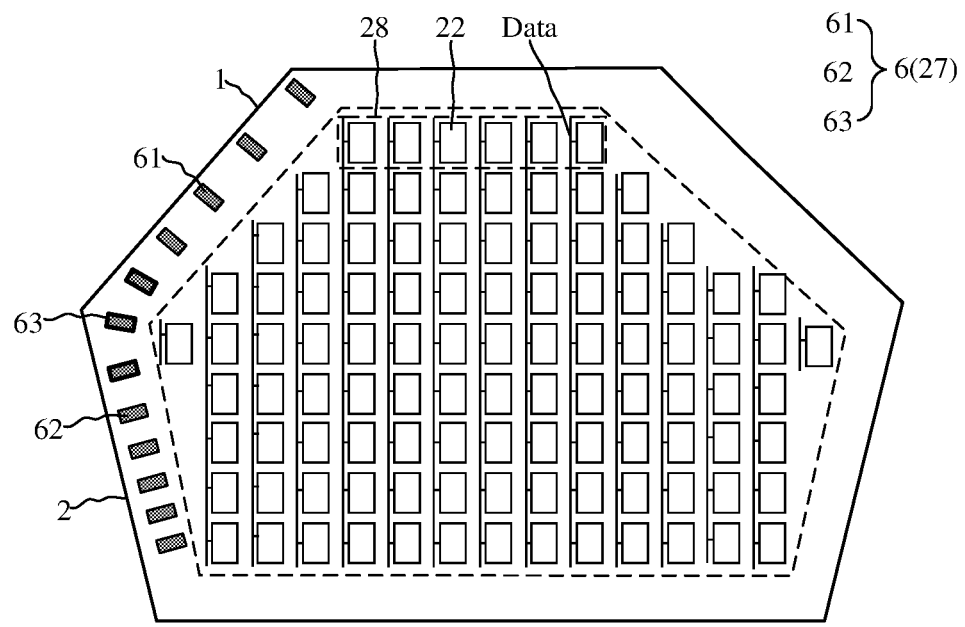
FIG. 18 is another partial schematic diagram of a display panel according to embodiments of the present disclosure.

FIG. 18 is another partial schematic diagram of a display panel according to an embodiment of the present disclosure. In an embodiment, as shown in FIG. 18, the spacing between adjacent third circuit units 63 is smaller than the spacing between adjacent first circuit units 61 and is larger than the spacing between adjacent second circuit units 62, so that the arrangement density of the third circuit units 63 is between the arrangement density of the first circuit units 61 and the arrangement density of the third circuit units 63 to achieve a uniform transition.

In some embodiments, referring to FIG. 18 again, the spacing between adjacent first circuit units 61 decreases along a direction pointing toward the third circuit unit 63, and/or the spacing between adjacent third circuit units 63 decreases along a direction pointing toward the second sub-circuit, and/or the spacing between adjacent second circuit units 62 decreases along a direction away from the third circuit unit 63. In this case, the arrangement densities of the circuit units decrease from the first circuit unit 61 to the third circuit unit 63 and then to the second circuit unit 62, and are gradually changed to better achieve a uniform transition.

Figure 19:
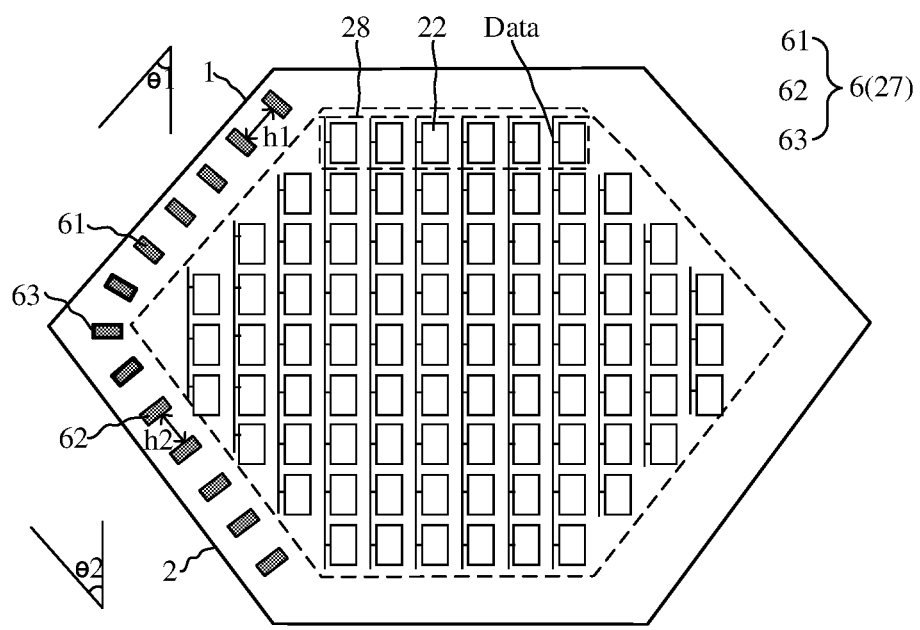
FIG. 19 is another partial schematic diagram of a display panel according to embodiments of the present disclosure.

FIG. 19 is another partial schematic diagram of a display panel according to an embodiment of the present disclosure. In some embodiments, as shown in FIG. 19, the first functional circuit 5 includes a shift register circuit 27. A data line Data is provided in the display area 3, an angle θ1 between the extension direction of the first panel edge 1 and the extension direction of the data line Data is equal to an angle θ2 between the extension direction of the second panel edge 2 and the extension direction of the data line Data, and a spacing h1 between adjacent first circuit units 61 is equal to a spacing h2 between adjacent second circuit units 62.

In combination with the previous analysis, when the angle between the extension direction of the first panel edge 1 and the first direction is equal to the angle between the extension direction of the second panel edge 2 and the first direction, angles between the panel edges and the extension direction of the pixel row 28 are equal to each other, and the numbers of the first functional circuit units 6 corresponding to one side of the panel edge are equal to each other over a same length, and thus the circuit units at a side of the two panel edges can be arranged in equal density.

In an embodiment, a scan signal line is provided in the display area 3, the first functional circuit 5 includes a first shift register circuit, the first circuit function unit 6 in the first shift register circuit is electrically connected to the scan signal line, and the first circuit function unit 6 is configured to sequentially output a scan signal to the scan signal line. In another embodiment, a light-emitting control signal line is provided in the display area 3, the first functional circuit 5 includes a second shift register circuit, the first circuit functional unit 6 in the second shift register circuit is electrically connected to the light-emitting control signal line, and the first circuit functional unit 6 is configured to sequentially output light-emitting control signals to the light-emitting control signal line. In some embodiments, a data line Data is provided in the display area 3, the first functional circuit 5 includes a selector circuit, the first circuit functional unit 6 in the selector circuit is electrically connected to the data line Data, and the first circuit functional unit 6 is configured to transmit the data voltage to different data lines Data in a time-division manner.

Exemplarily, in one configuration, when the display panel is a liquid crystal display panel, the first functional circuit 5 may include at least one of a first shift register circuit or a selector circuit. When the display panel is an organic light-emitting diode display panel, the first functional circuit 5 may include at least one of a first shift register circuit, a second shift register circuit, or a selector circuit.

The structure and the function of the first shift register circuit, the second shift register circuit, and the selector circuit are the same as those in the related art, and will not be repeated herein.

The extension direction of the first panel edge 1 and the second panel edge 2 in the drawings provided in the embodiments of the present disclosure is only a schematic illustration, and the technical solution provided in the embodiment of the present disclosure can be applied to display panels with various shapes such as rhombus, parallelogram, regular polygon, irregular polygon, etc. The embodiments of the present disclosure will not be illustrated exemplarily one by one.

Figure 20:
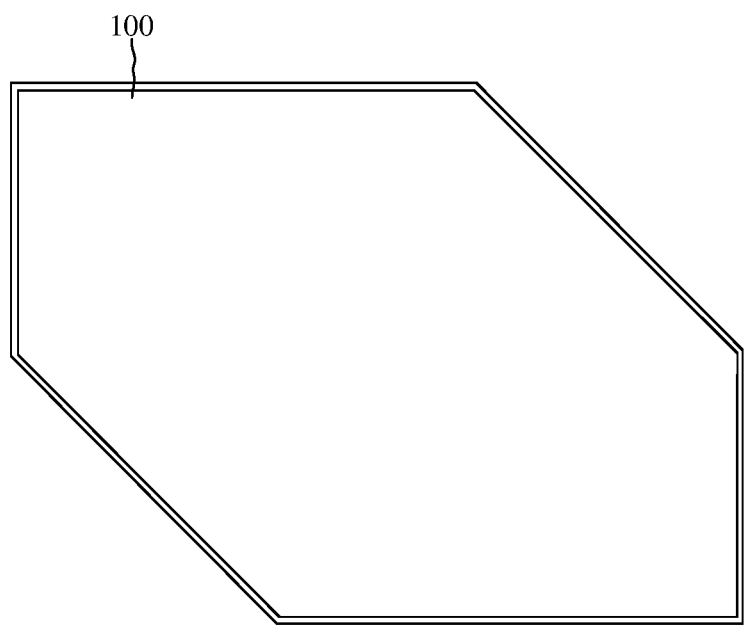
FIG. 20 is a schematic diagram of a display device according to embodiments of the present disclosure.

An embodiment of the disclosure also provides a display device. FIG. 20 is a schematic diagram of a display device according to an embodiment of the disclosure. In some embodiments, as shown in FIG. 20, the display device includes the above display panel 100. The specific structure of the display panel 100 has been described in detail in the above embodiments, and will not be repeated herein. The display device shown in FIG. 20 is only a schematic illustration, and the display device can be, for example, an on-vehicle display screen, a phone, a tablet computer, a laptop computer, an electric paper book or a television set, and any other electronic device with a display function.

The above-described embodiments are merely exemplary embodiments of the present disclosure and are not intended to limit the present disclosure. Any modifications, equivalent substitutions, and improvements made within the principle of the present disclosure shall fall into the protection scope of the present disclosure.

Finally, it should be noted that, the above embodiments are merely for illustrating the present disclosure but not intended to provide any limitation. Although the present disclosure has been described in detail with reference to the above embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope of the present disclosure.

What is claimed is:

1. A display panel comprising:
a display area;
a bezel area surrounding the display area;
a first panel edge;
a second panel edge adjacent to and connected to the first panel edge, wherein the first panel edge and the second panel edge extend linearly along different directions; and
a first functional circuit disposed in the bezel area, the first functional circuit comprising first functional circuit units, the first functional circuit units comprising first circuit units, second circuit units, and at least one third circuit unit,
wherein the first circuit units are located at a side of the first panel edge and arranged in a straight line along the first panel edge, the second circuit units are located at a side of the second panel edge and arranged in a straight line along the second panel edge, and the at least one third circuit unit is located between the first circuit units and the second circuit units and is close to a position where the first panel edge is connected to the second panel edge, and one of the at least one third circuit unit is arranged in a direction inclined with respect to each of a direction in which one of the first circuit units is arranged and a direction in which one of the second circuit units is arranged.

2. The display panel according to claim 1, wherein the at least one third circuit unit comprises a plurality of third circuit units arranged along an edge of a virtual annulus; and
wherein the virtual annulus comprises a center of a circle located in the display area and an outer edge tangential to both the first panel edge and the second panel edge.

3. The display panel according to claim 2, wherein at least one of the first circuit units that is close to the at least one third circuit unit is located in the virtual annulus, and at least one of the second circuit units that is close to the at least one third circuit unit is located in the virtual annulus.

4. The display panel according to claim 2, wherein one of the first circuit units is spaced apart from the first panel edge, one of the second circuit units is spaced apart from the second panel edge, and one of the plurality of third circuit units is spaced apart from the outer edge of the virtual annulus.

5. The display panel according to claim 4, wherein a distance between the first panel edge and the one of the first circuit units, a distance between the second panel edge and the one of the second circuit units and, and a distance between the outer edge of the virtual annulus and the one of the plurality of third circuit units and are equal to each other.

6. The display panel according to claim 2, wherein third circuit units of the plurality of third circuit units are spaced apart from each other at an equal interval.

7. The display panel according to claim 1, wherein the bezel area is provided with a first linear bezel, a corner bezel, and a second linear bezel that are defined by the first panel edge and the second panel edge,
wherein the first circuit units are located at the first linear bezel, the second circuit units are located at the second linear bezel, and the at least one third circuit unit is located at the corner bezel; and
wherein the first linear bezel and the second linear bezel have a same bezel width, and a distance between the display area and one of the first circuit units is equal to a distance between the display area and one of the second circuit units.

8. The display panel according to claim 1, wherein the bezel area is comprises with a first linear bezel, a corner bezel, and a second linear bezel that are defined by the first panel edge and the second panel edge, wherein the first circuit units are located at the first linear bezel, the second circuit units are located at the second linear bezel, and the at least one third circuit unit is located at the corner bezel; and
wherein the second linear bezel comprises a bezel width greater than a bezel width of the first linear bezel, and a distance between the display area and one of the second circuit units is greater than a distance between the display area and one of the first circuit units.

9. The display panel according to claim 1, further comprising:
a second functional circuit located in the bezel area, the second functional circuit comprising second functional circuit units, at least one of the second functional circuit units being located between the display area and the first functional circuit units located at a side of a first sub-unit, and the first sub-unit being one of the at least one third circuit unit that is closest to the display area.

10. The display panel according to claim 9, wherein the first functional circuit units further comprise a second sub-unit and third sub-units, wherein the second sub-unit is adjacent to the first sub-unit, the third sub-units are located at a side of the second sub-unit away from the first sub-unit, and a spacing between the first sub-unit and the second sub-unit is greater than a spacing between remaining adjacent third circuit units; and
wherein the second functional circuit units comprise at least one fourth circuit unit and at least one fifth circuit unit, at least one of the at least one fourth circuit unit being located between the first sub-unit and the second sub-unit, and the at least one fifth circuit unit being located at a side of the second sub-unit close to the display area and a side of at least one of the third sub-units close to the display area.

11. The display panel according to claim 10, further comprising:
a driving signal line connected to the first functional circuit units, the driving signal line comprising at least one first signal line, and the at least one first signal line being located at a side of the second functional circuit away from the display area and each extending towards the second functional circuit,
wherein one of the at least one first signal line comprises a bending portion located between the first sub-unit and the second sub-unit, the bending portion being bent away from the display area, and at least one of the at least one fourth circuit unit being located at a side of the bending portion close to the display area.

12. The display panel according to claim 10, further comprising:
at least one dummy sub-pixel, wherein one of the at least one dummy sub-pixel is located between the display area and one of the at least one fourth circuit unit.

13. The display panel according to claim 10, wherein the second functional circuit comprises a first-type second functional circuit, the second sub-unit comprises a first-type second sub-unit, and at least one of the third sub-units each comprises a first-type third sub-unit,
- wherein the first-type second sub-unit and the first-type third sub-unit are located at a side of the first sub-unit, and the first-type third sub-unit comprises one of the first circuit units, and
- wherein, in the first-type second functional circuit, at least one of the at least one fourth circuit unit is located between the first sub-unit and the first-type second sub-unit, and one of the at least one fifth circuit unit is located at a side of the first-type second sub-unit close to the display area and a side of the first-type third sub-unit close to the display area;

and/or,
- wherein the second functional circuit comprises a second-type second functional circuit, the second sub-unit comprises a second-type second sub-unit, and the third sub-units comprise a second-type third sub-unit, wherein the second-type second sub-unit and the second-type third sub-unit are located at another side of the first sub-unit, and the second-type third sub-unit comprises one of the second circuit units, and
- wherein, in the second-type second functional circuit, at least one of the at least one fourth circuit unit is located between the first sub-unit and the second-type second sub-unit, and the at least one fifth circuit unit is located at a side of the second-type second sub-unit close to the display area and a side of the second-type third sub-unit close to the display area.

14. The display panel according to claim 13, further comprising:
- a data line located in the display area,
- wherein the bezel area further comprises a bonding area, wherein a distance between the bonding area and one of the first circuit units is greater than a distance between the bonding area and one of the second circuit units; and
- wherein the first-type second functional circuit comprises a protection circuit connected to the data line, and the second-type second functional circuit comprises a selector circuit connected to the data line.

15. The display panel according to claim 14, further comprising:
- a third panel edge,
- wherein the third panel edge and the data line extend in two directions that are perpendicular to each other; and
- wherein the bonding area is located at a side of the third panel edge, and the second-type second functional circuit is connected to a pin in the bonding area by a connection lead.

16. The display panel according to claim 14, wherein the bonding area is located between the second panel edge and one of the second circuit units, and the second-type second functional circuit is connected to a pin in the bonding area by a connection lead.

17. The display panel according to claim 1, further comprising:
- a data line located in the display area, wherein the first functional circuit comprises a shift register, an angle between an extension direction of the first panel edge and an extension direction of the data line is greater than an angle between an extension direction of the second panel edge and the extension direction of the data line, and a spacing between adjacent first circuit units is greater than a spacing between adjacent second circuit units.

18. The display panel according to claim 17, wherein a spacing between adjacent third circuit units is smaller than a spacing between adjacent first circuit units and is greater than a spacing between adjacent second circuit units.

19. The display panel according to claim 1, further comprising:
- a data line located in the display area, wherein the first functional circuit comprises a shift register, an angle between an extension direction of the first panel edge and an extension direction of the data line is equal to an angle between an extension direction of the second panel edge and the extension direction of the data line, and a spacing between adjacent first circuit units is equal to a spacing between adjacent second circuit units.

20. A display device, comprising a display panel comprising:
- a display area;
- a bezel area surrounding the display area;
- a first panel edge;
- a second panel edge adjacent to and connected to the first panel edge, wherein the first panel edge and the second panel edge extend linearly along different directions, respectively; and
- a first functional circuit disposed in the bezel area, the first functional circuit comprising first functional circuit units, the first functional circuit units comprising first circuit units, second circuit units, and at least one third circuit unit,
- wherein the first circuit units are located at a side of the first panel edge and arranged in a straight line along the first panel edge, the second circuit units are located at a side of the second panel edge and arranged in a straight line along the second panel edge, and the at least one third circuit unit is located between the first circuit units and the second circuit units and is close to a position where the first panel edge is connected to the second panel edge, and one of the at least one third circuit unit is arranged in a direction inclined with respect to each of a direction in which one of the first circuit units is arranged and a direction in which one of the second circuit units is arranged.

* * * * *